United States Patent
Mercer

(10) Patent No.: US 7,123,415 B2
(45) Date of Patent: Oct. 17, 2006

(54) OPTICAL INSTRUMENT AND OPTICAL ELEMENT PROVIDING EXPANDED EXIT PUPIL

(75) Inventor: Graham Mercer, Surrey (GB)

(73) Assignee: Vision Engineering Limited, Woking (GB)

( * ) Notice: Subject to any disclaimer, the term of this patent is extended or adjusted under 35 U.S.C. 154(b) by 0 days.

(21) Appl. No.: 10/221,157

(22) PCT Filed: Mar. 20, 2001

(86) PCT No.: PCT/GB01/01222

§ 371 (c)(1),
(2), (4) Date: Sep. 18, 2002

(87) PCT Pub. No.: WO01/71412

PCT Pub. Date: Sep. 27, 2001

(65) Prior Publication Data

US 2003/0025999 A1 Feb. 6, 2003

(30) Foreign Application Priority Data

Mar. 20, 2000 (GB) .................................. 0006725.6

(51) Int. Cl.
*G02B 27/44* (2006.01)
*G02B 5/18* (2006.01)

(52) U.S. Cl. ....................... 359/569; 359/566; 359/573; 359/575; 345/8

(58) Field of Classification Search ................ 359/565, 359/566, 569, 576, 368, 372, 373, 374, 457, 359/573, 575; 353/122; 345/8
See application file for complete search history.

(56) References Cited

U.S. PATENT DOCUMENTS

| | | | |
|---|---|---|---|
| 3,453,035 A | 7/1969 | Walther | |
| 5,046,793 A | 9/1991 | Hockley et al. | |
| 5,218,471 A * | 6/1993 | Swanson et al. | 359/565 |
| 5,701,132 A | 12/1997 | Kollin et al. | |
| 6,028,704 A | 2/2000 | Freeman | |
| 6,608,720 B1 * | 8/2003 | Freeman | 359/569 |

FOREIGN PATENT DOCUMENTS

| | | |
|---|---|---|
| EP | 0584769 | 3/1992 |
| WO | WO 89/06818 | 7/1989 |
| WO | WO 94/27177 | 11/1994 |

OTHER PUBLICATIONS

Optical Engineering, "Dammann gratings for laser beam shaping", Jahns et al., Dec. 1989, vol. 28, No. 12, pp. 1267 to 1275.

* cited by examiner

*Primary Examiner*—Audrey Chang
(74) *Attorney, Agent, or Firm*—Shoemaker and Mattare

(57) ABSTRACT

The invention provides an optical instrument including means (1, 2) to produce an optical image to be viewed by an observer including a diffractive element (7) located at an intermediate focal or image plane (4) of the optical instrument and comprising a pattern of a plurality of areas effective to cause diffraction interference in light passing through the optical instrument and thereby produce an expanded exit pupil (6) comprising a combination of a multiplicity of exit pupils displaced relative to one another transverse to an optical axis (3) of said instrument.

12 Claims, 6 Drawing Sheets

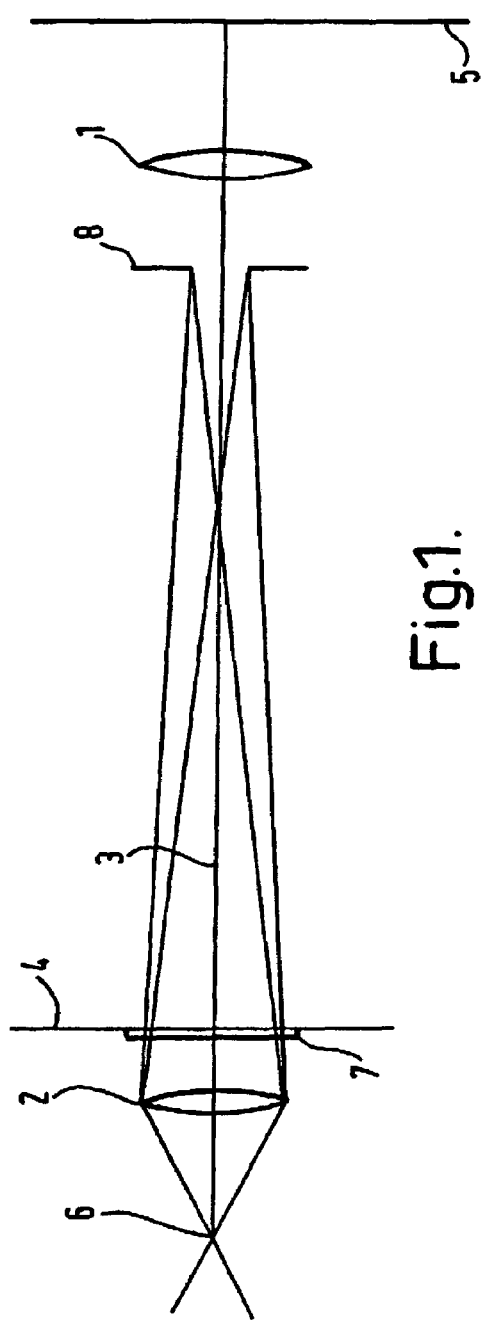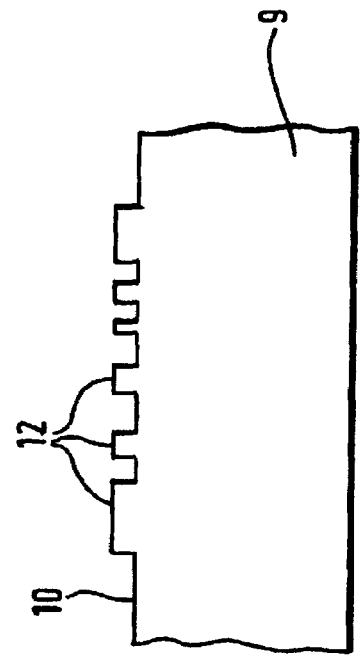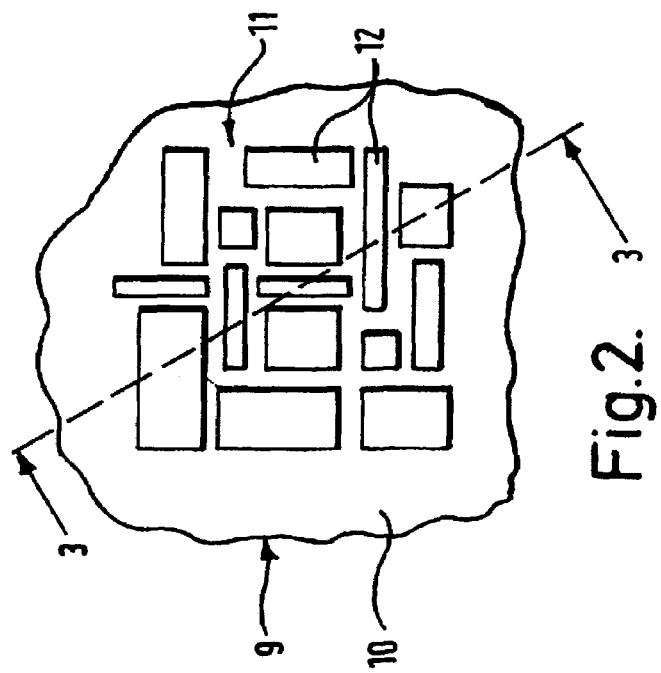

OPTICAL INSTRUMENT AND OPTICAL ELEMENT PROVIDING EXPANDED EXIT PUPIL

Figure 4:
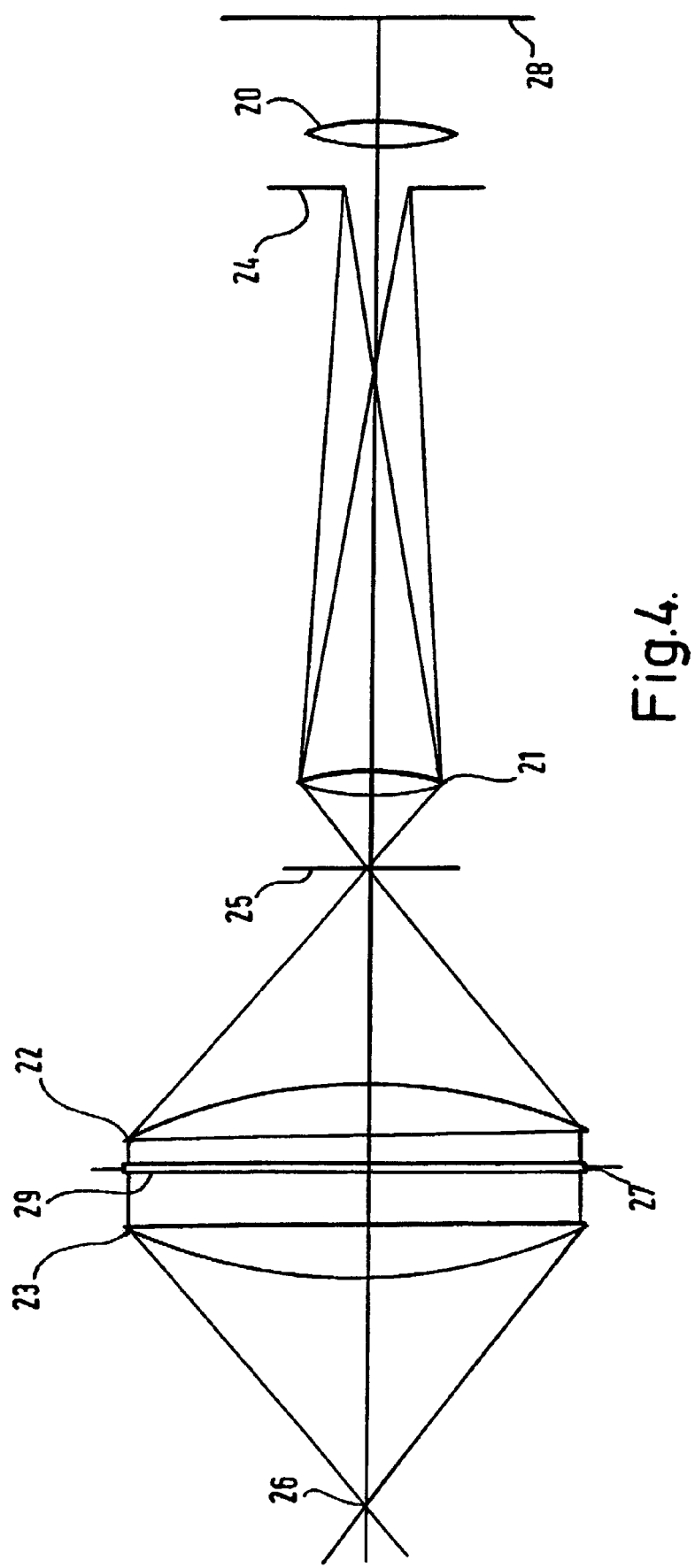

This invention relates to optical instruments and in particular to optical instruments having an exit pupil at which an image of an object may be viewed by an observer.

In conventional optical instruments the size of the exit pupil is determined by a function of the numerical aperture of the instrument and the overall magnification of the instrument and hence the size of the exit pupil is of fixed and relatively small dimension. Consequently it is necessary for an observer to accurately align the entrance pupil of his eye with the exit pupil of the optical instrument in order properly to view an image or otherwise receive light from the instrument.

European patent application No. 94905777.2 discloses optical apparatus provided with an enlarged exit pupil whereby an observer is able to enjoy the freedom to receive images or light from the optical apparatus by placing his eye pupil anywhere within an enlarged exit pupil. The enlarged exit pupil is obtained by the provision of a diffractive element located at an intermediate focal or image plane of the optical instrument. The diffractive element comprises a substrate having a plurality of parallel first grooves in a surface of the substrate, edges of the first grooves being coincident and forming lines of a first diffractive grating and a plurality of parallel second grooves in the surface of the substrate, the second grooves extending perpendicular to the first grooves and edges of the second grooves being coincident and forming lines of a second diffractive grating. While a construction of diffractive element as described in European patent application No. 94905777.2 produces an enlarged exit pupil it has been found that the light energy distribution over the extent of the enlarged exit pupil is non-uniform. The light energy has a maximum energy level in a central region of the enlarged exit pupil and has an energy level that decreases at locations spaced from the central region towards the periphery of the enlarged exit pupil. Furthermore if the diffraction element is designed to produce a more uniform energy level distribution over the extent of a required enlarged exit pupil, there is significant light energy beyond the extent of the required enlarged exit pupil and this energy is unused and wasted.

According to one aspect of the invention an optical instrument including means to produce an optical image to be viewed by an observer includes a diffractive element located at an intermediate focal or image plane of the optical instrument and comprising a pattern of a plurality of areas effective to produce an expanded exit pupil comprising a combination of a multiplicity of exit pupils displaced relative to one another transverse to an optical axis of said instrument.

According to a second aspect of the invention a diffractive element for use in an optical instrument comprises a pattern of a plurality of areas effective to produce diffractive interference of light passing through or reflected by said element and thereby to produce an expanded exit pupil comprising a combination of a multiplicity of exit pupils displaced relative to one another transverse to an optical axis of said instrument.

Figure 5:
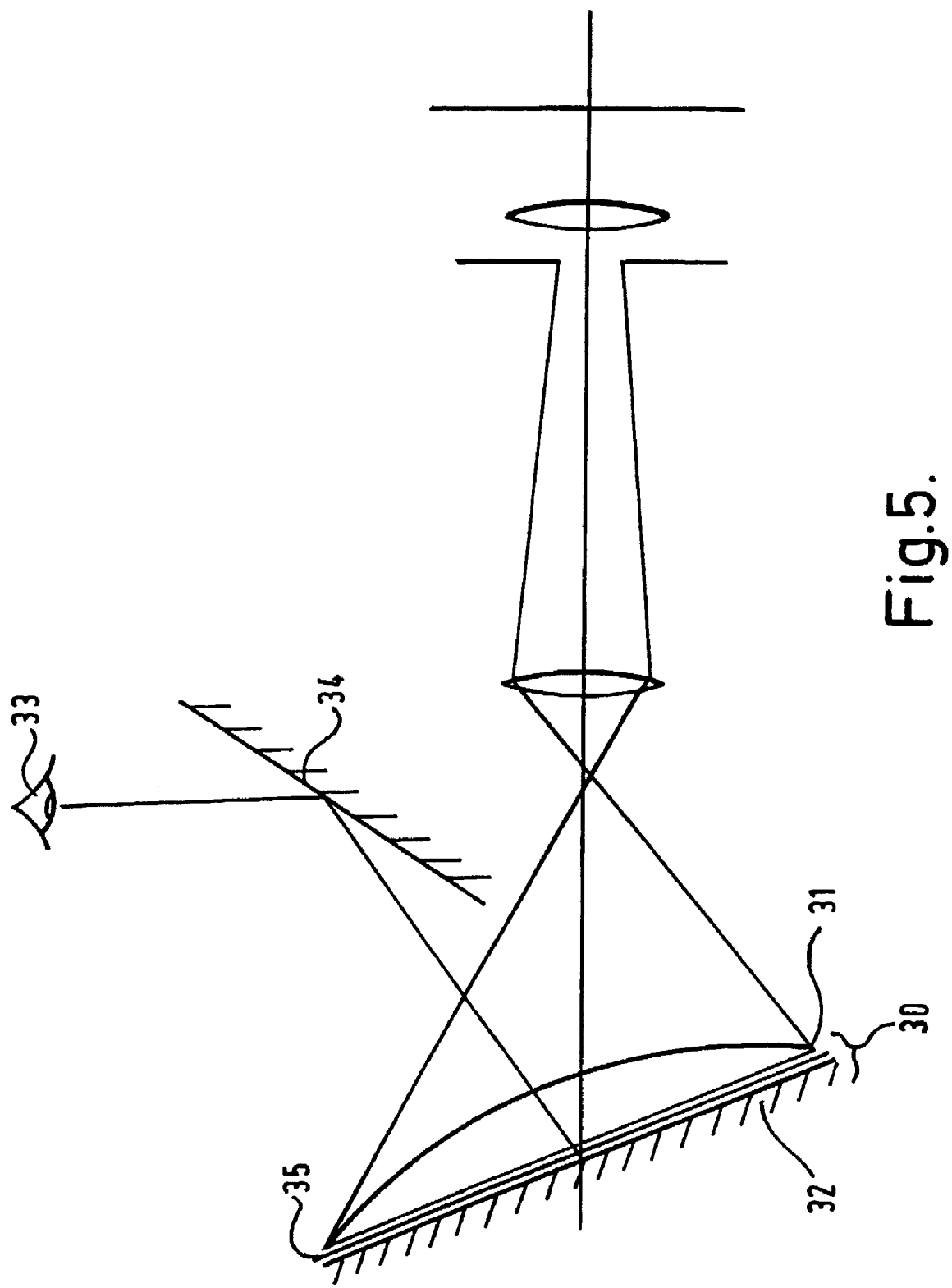
Figure 6:
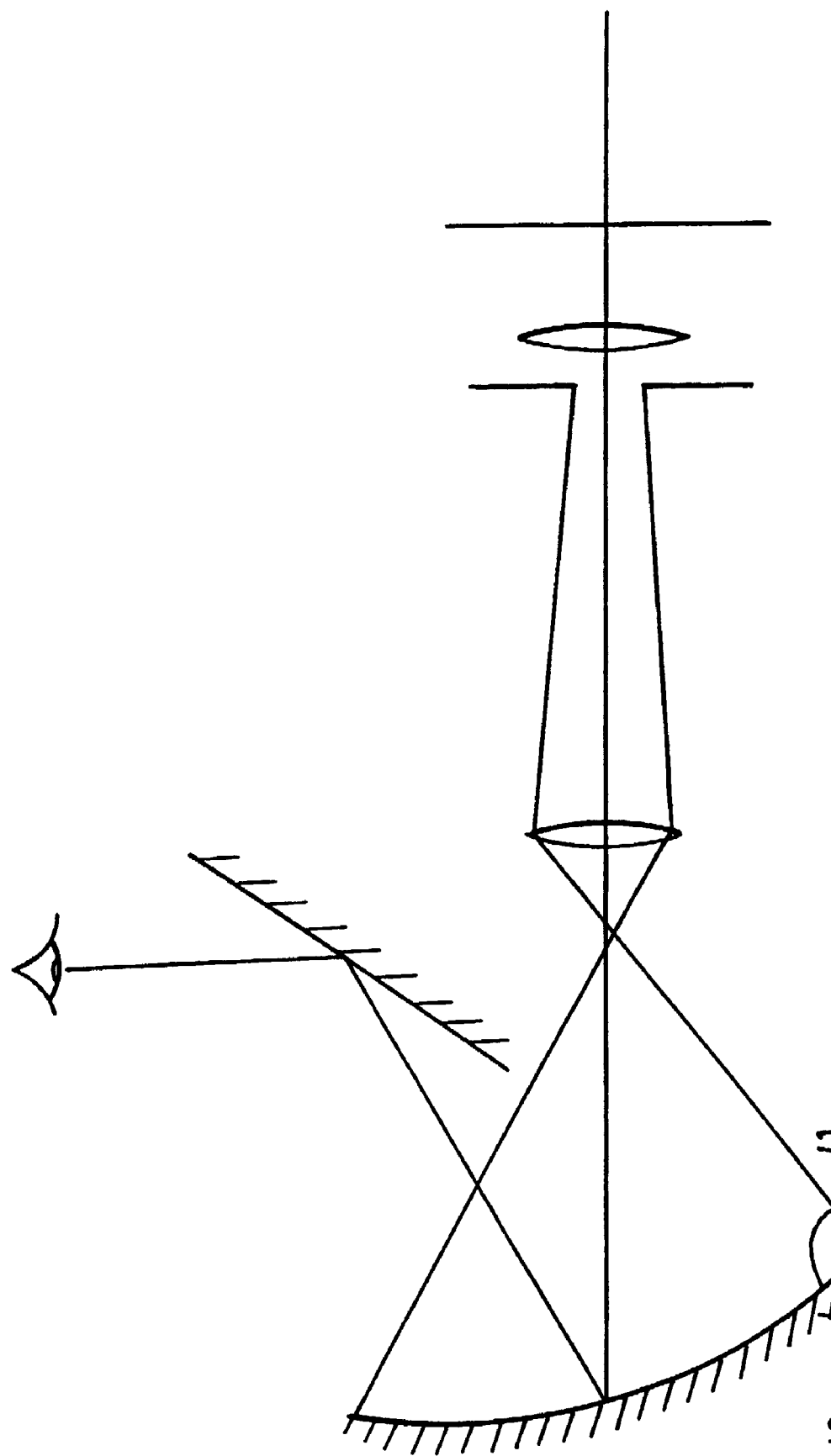
Figure 7:
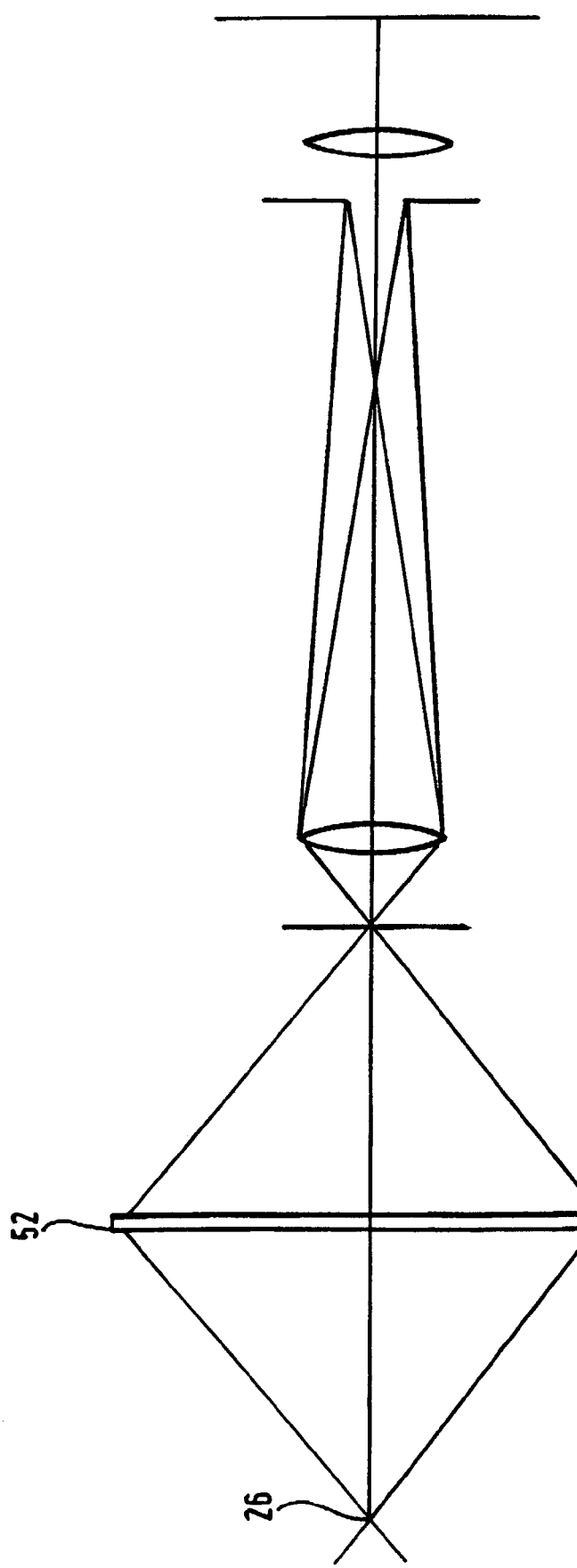
Figure 8:
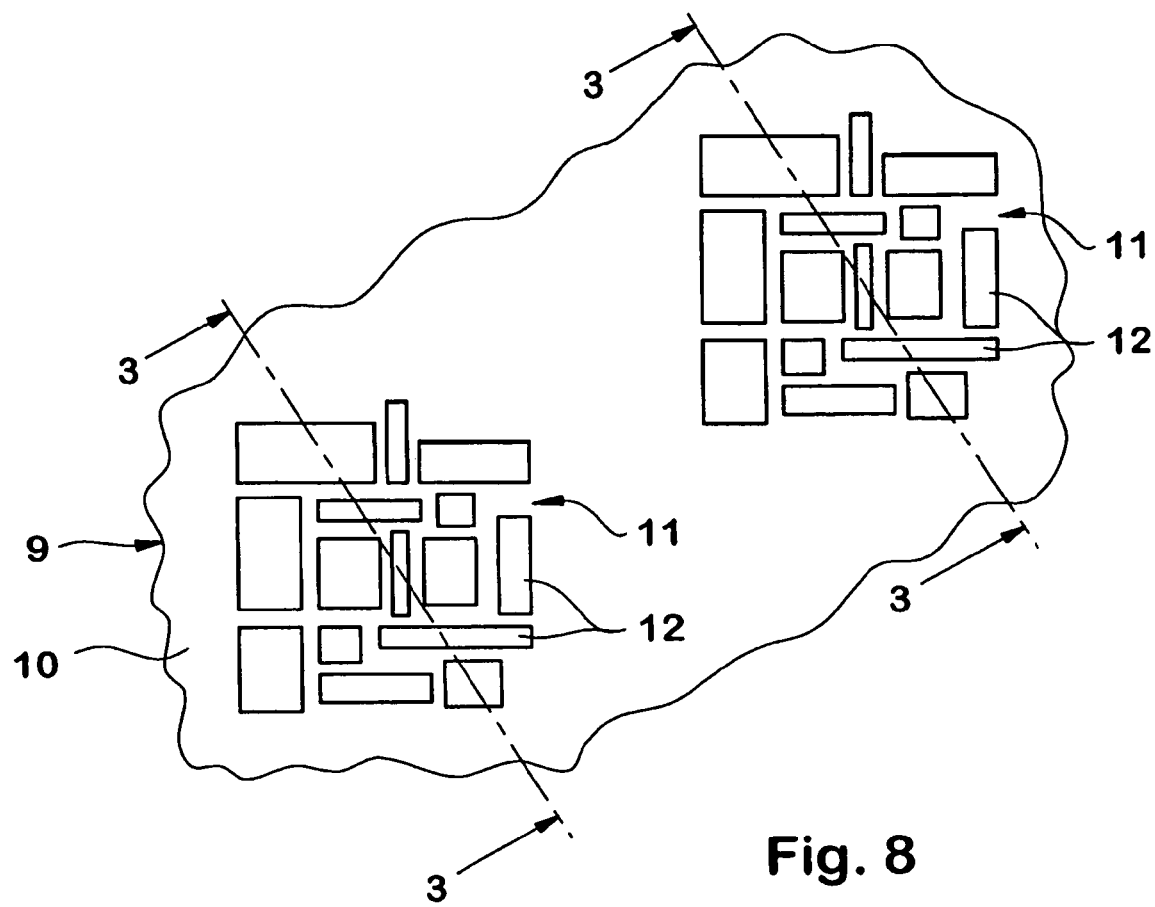
Figure 9:
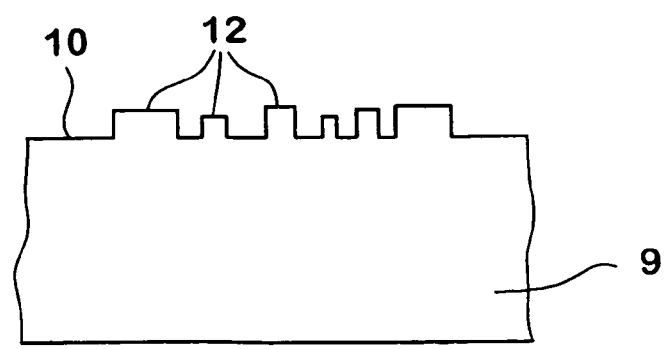

An embodiment of the invention will now be described by way of example with reference to the drawings in which:

FIG. 1 shows optical elements of a microscope incorporating a diffractive element, FIG. 2 is a plan view of a part of a surface of a diffractive optical element, FIG. 3 illustrates a profile of the diffractive element on the line 3—3 of FIG. 2, FIG. 4 shows optical elements of a projection microscope utilising a transmissive diffractive element, FIG. 5 shows an alternative form of projection microscope using a reflective diffractive element, FIG. 6 shows an alternative construction of the projection microscope illustrated in FIG. 5, FIG. 7 shows the optical elements of a projection microscope utilising a combined Fresnel lens system and diffractive array, FIG. 8 is a plan view of a part of a surface of an alternative diffractive optical element, and FIG. 9 illustrates a profile of the diffractive element on the line 3—3 of FIG. 8.

Referring first to FIG. 1, a microscope includes an objective lens 1 and an eyepiece 2 aligned on an optical axis 3. The objective lens produces an intermediate image in a focal or image plane 4 of an object in an object plane 5. When an eye of an observer is aligned with an exit pupil located at 6 a magnified image of the intermediate image and hence of my be observed. A transmissive diffractive element 7 is located at the intermediate focal or image plane 4 of the microscope. In the absence of the diffractive element 7 an exit pupil of relatively small extent would be produced at the location 6. However, the diffractive element is effective to produce a multiplicity of exit pupils at the location 6 displaced transversely of the axis 3 relative to one another. In combination, the multiplicity of relatively displaced exit pupils form an expanded exit pupil that is of greater transverse extent than the exit pupil that would be formed in the absence of the diffractive element 7.

If desired the aperture of the object lens may be defined by an aperture stop 8. The aperture stop 8 may be circular and the exit pupil will then also be circular. However the aperture may be of a shape which is not circular and for example may be rectangular, square or hexagonal. The multiplicity of exit pupils that in combination form the expanded exit pupil are each produced with a shape corresponding to the aperture stop 8. The transverse displacement of the exit pupils relative to each other and the light energy in each of the multiplicity of exit pupils determines the light energy distribution across the extent of the expanded exit pupil. It is desired that the expanded exit pupil appears to the eye of an observer as a single continuous expanded exit pupil. Furthermore it is desired that the exit pupils are so located transverse to the axis 3 of the microscope and that the light energy in each of the multiplicity of exit pupils is such as to produce a required light energy distribution across the extent of the expanded exit pupil. Usually it is desired that the light energy distribution across a required extent of the expanded exit pupil is substantially uniform and that at a peripheral edge of the required extent of the expanded exit pupil there is a relatively sharp decline in light energy so that there is an insignificant level of light energy beyond the required extent of the expanded exit pupil. However if desired the light energy distribution may rise to a maximum in an area located centrally of the expanded exit pupil whereby a viewer tends to be drawn toward an eye location aligned with the centre of the expanded exit pupil.

Referring now to FIG. 2, the diffractive element 6 includes a substrate 9 having a surface 10, the surface 10 extending transversely to the axis 3 of the microscope. A pattern 11 of a plurality of areas 12 is formed on the surface 10. Light passing through the diffractive element is subject to diffractive interference due to the presence of the areas 12 and as a result, instead of the relatively small exit pupil that would be formed in the absence of the diffractive element, a multiplicity of relatively transversely displaced exit pupils are formed that in combination form an expanded exit pupil. The pattern 11 of areas 12 may extend across the whole of the surface 10 of the substrate or the pattern may extend over a part of the surface and be replicated over the remainder of the surface 10.

For purposes of illustration only, the areas are shown in FIG. 2 as of rectangular shape and of different dimensions. However it is to be understood that the areas 12 may be of the same or similar dimensions and shape or the areas may be of different predetermined shapes and dimensions located at predetermined locations in the pattern 11 provided that the light passing through the diffraction element is diffracted in such a manner as to result in the formation of a multiplicity of exit pupils that in combination form an expanded exit pupil. A further requirement of the diffraction element is that the relative displacement of the exit pupils and the light energy level in each exit pupil forming the expanded exit pupil is such as to result in a required light energy distribution across a required extent of the expanded exit pupil. The areas are illustrated in FIG. 2 as being rectangular and defined by linear sides extending in two mutually perpendicular directions. However it is to be understood that the areas may be of different shape defined by sides which are non-linear, i.e. the sides may be arcuate, and the sides may extend in more than two directions to provide the required extent of expanded exit pupil having the required light energy distribution.

The areas 12 may be formed to be two-dimensional and extending on or immediately adjacent the surface 10. The two-dimensional areas may be formed by deposition of an ink pattern or by exposure and subsequent development of an actinic photoresist. Alternatively the areas may be formed to be three-dimensional such that the areas 12 are projections extending to a predetermined height or heights from the remainder of the surface 10, as shown in FIG. 3, or such that the areas are depressions lying at a predetermined depth or depths below the remainder of the surface 10.

The pattern of areas 12 may be formed by various methods. For example the pattern of areas may be formed by holographic exposure of a laser wavefront interference pattern into an actinic photoresist deposited on the surface 10 of the substrate 9. Another example of a method of forming the areas 12 is by direct writing of a Fourier transform pattern, using an electron beam, into actinic photoresist. After exposure the photoresist is developed to produce the required pattern of areas 12.

While examples of methods of forming the areas 12 are disclosed hereinbefore, it is to be understood that these are provided by way of example and are not to be taken as limiting the invention to formation of the areas by these specific-methods.

It will be appreciated that when multichromatic light comprising light of a plurality of different wavelengths is acted on by a diffraction element, the diffraction of the light is dependent upon the wavelength of the light. However it is often desired to operate a microscope and other optical instruments using multichromatic light. The formation of a multiplicity of relatively displaced exit pupils decreases observed colour fringing effects and enhances the image observed by the viewer. Furthermore overlapping of the multiplicity of exit pupils tends to cancel colour fringing effects and thereby reduce the observed colour fringing.

Other forms of optical instrument utilising a diffractive element to produce an expanded exit pupil comprising an array of exit pupils will now be described with reference to FIGS. 4 to 7.

FIG. 4 shows a projection microscope including an objective lens 20, a projection eyepiece 21 and field lenses 22, 23. In this construction of projection microscope the projection eyepiece images the aperture of the object lens 20 or, if provided, of an aperture stop 24 to form an intermediate exit pupil at an intermediate plane 25. The field lenses 22, 23 relay an image of the intermediate exit pupil at plane 25 to a final exit pupil at location 26 for an observer. The objective lens 20 and the projection eyepiece 21 form an image in a plane 27 intermediate the field lenses 22, 23 of an object in an object plane 28. A transmissive diffractive element 29 is located in the plane 27 to produce a multiplicity of images of the intermediate exit pupil in plane 25 such as to form an expanded final exit pupil at the location 26.

FIG. 5 shows a further embodiment of a projection microscope in which, instead of forming an image at a transmissive diffractive element as in the microscope shown in FIG. 1 and the projection microscope shown in FIG. 4, the image is formed at a reflective diffractive element 30. A single field lens 31 and a reflective element 32 is provided to form an image for viewing by an eye 33 of an observer via a mirror 34. A diffractive element 35 is provided adjacent the surface of the reflective element 32. The diffractive element 35 may be a separate element as illustrated in FIG. 5 or may be integral with the reflective element 32 and be formed on the reflective surface of the reflective element 32. Instead of a field lens 31 and planar mirror 32, a concave part-spherical reflective element 40 may be provided as shown in FIG. 6. A diffractive element 41 may be integral with the concave reflective element and be formed on the part-spherical concave surface of the reflective element so that the diffractive element has the form of curvature of the surface of the reflective element.

Thus it will be understood that the invention provides an optical instrument including an optical diffractive element located at an intermediate image plane of the optical instrument which produces by reflective diffractive means or refractive diffractive means together with an associated field lens or mirror system, a multiplicity of exit pupils forming in combination an expanded exit pupil at the viewing position for an eye of an observer.

If desired, instead of using a refractive field lens, as shown in FIG. 4, a Fresnel lens may be provided and the pattern of areas forming the diffractive element may be formed on a surface of the Fresnel lens. Thus as shown in FIG. 7, a single optical element 52 may perform the functions of the field lens system and of the diffractive element to generate a multiplicity of relatively displaced exit pupils to form an expanded exit pupil at the location 26.

It is envisaged that usually the diffractive element would remain stationary relative to the other optical elements of the optical instrument. However in some instances it may be desirable to move the diffractive element relative to the other optical elements of the optical instrument for example by rotation of the diffractive element about an axis perpendicular to the plane of the element, or in the case of a concave part-spherical element, about a central axis of the element. Such rotation may be effected by providing an electric motor and a drive transmission from the motor to the diffractive element.

Hereinbefore the invention has been described in relation to microscopes however it is to be understood that the invention is not limited to microscopes and may be utilised to produce expanded exit pupils for other forms of optical instrument or apparatus.

As mentioned hereinbefore, the diffractive element may be a separate element or may be formed integrally with another optical element such as a lens or mirror of the optical apparatus. When the diffractive element is formed integrally with another optical element such as a lens or mirror, the other optical element acts as a substrate of the diffractive element and the pattern of areas is formed on a surface of the other optical element.

It is to be understood that where reference is made in the specification to a lens, mirror or other optical element such element may comprise a single optical element or a compound optical element consisting of a combination of elements.

The invention claimed is:

1. A diffractive element for use in an optical instrument, comprising a plurality of replications of a pattern of separated diffraction structures each effective to produce diffractive interference of polychromatic light passing through or reflected by the diffractive element, the plurality of diffraction structures including diffraction structures of different sizes and shape, and the plurality of replications are configured to produce a plurality of exit pupils which are displaced relative to one another transverse to an optical axis of the optical instrument such as to be viewable as a single, continuous expanded exit pupil and which have a light energy such that a light energy distribution across an extent of the expanded exit pupil is substantially uniform.

2. A diffractive element as claimed in claim 1, wherein the diffraction structures of the plurality of diffraction structures are two-dimensional.

3. A diffractive element as claimed in claim 1, wherein the diffraction structures of the plurality of diffraction structures are three-dimensional.

4. A diffractive element as claimed in claim 3, wherein the diffraction structures of the plurality of diffraction structures comprise projections.

5. A diffractive element as claimed in claim 4, wherein the projections are of one height.

6. A diffractive element as claimed in claim 4, wherein the projections extend to more than one height.

7. A diffractive element as claimed in claim 3, wherein the diffraction structures of the plurality of diffraction structures comprise depressions.

8. A diffractive element as claimed in claim 7, wherein the depressions are of one depth.

9. A diffractive element as claimed in claim 7, wherein the depressions lie at more than one depth.

10. A diffractive element as claimed in claim 1, wherein the plurality of replications are such that the plurality of exit pupils are overlapping.

11. An optical instrument for producing an optical image to be viewed by an observer, the optical instrument including the diffractive element of claim 1 located at an intermediate focal or image plane thereof.

12. An optical instrument as claimed in claim 11, including an optical element, and wherein the diffractive element is formed on or is integral with a surface of the optical element.

* * * * *